June 18, 1968 C. W. ROSMANITH 3,389,402
FRONT-LOADING HEATED STYLUS RECORDER
Filed March 14, 1967 7 Sheets-Sheet 1

Carl W. Rosmanith
Inventor

June 18, 1968  C. W. ROSMANITH  3,389,402
FRONT-LOADING HEATED STYLUS RECORDER
Filed March 14, 1967  7 Sheets-Sheet 2

Carl W. Rosmanith
Inventor

June 18, 1968 C. W. ROSMANITH 3,389,402
FRONT-LOADING HEATED STYLUS RECORDER
Filed March 14, 1967 7 Sheets-Sheet 5

Carl W. Rosmanith
Inventor

June 18, 1968 C. W. ROSMANITH 3,389,402
FRONT-LOADING HEATED STYLUS RECORDER
Filed March 14, 1967 7 Sheets-Sheet 6

Fig. 11

Carl W. Rosmanith
Inventor

June 18, 1968  C. W. ROSMANITH  3,389,402
FRONT-LOADING HEATED STYLUS RECORDER
Filed March 14, 1967  7 Sheets-Sheet 7

Carl W. Rosmanith
Inventor

United States Patent Office 3,389,402
Patented June 18, 1968

3,389,402
FRONT-LOADING HEATED STYLUS RECORDER
Carl W. Rosmanith, Des Plaines, Ill., assignor to Beckman Instruments, Inc., a corporation of California
Filed Mar. 14, 1967, Ser. No. 622,987
10 Claims. (Cl. 346—76)

ABSTRACT OF THE DISCLOSURE

A front-loading recorder having tracks on its side plates for guiding a chart roll spindle to bearing surfaces and sickle-shaped lever arms attached to the sides of a front panel hinged along the bottom to raise and lower the spindle on the track. A spring biased arm bears against a square flange while a chart roll is being lowered into position and lifted off the flange by a pin on the sickle-shaped arm when the front panel is raised into a substantially upright position by an eccentrically pivoted bar on which the panel is hinged. A tension roller on the back of the panel engages two guide rollers, one carried by a spring biased arm, to assure constant tension as the paper is pulled over a chart-forming bar on the top of the panel by a chart drive roller in front of the panel.

---

This invention relates to improvements in chart recorders and more particularly to improvements in a front-loading chart recorder.

Chart recorders adapted to be loaded from the front are commonly used for mounting in standard cabinet racks or similar enclosures. In operation, the chart is driven from a roll stored within the recorder past a chart-forming bar or writing table and over a front panel for viewing to a take-up roll or the like. To load or remove a roll of chart, the front panel is either removed or preferably swung down from a substantially upright position until it engages its limit stops in a substantially horizontal position. A retaining rod or spindle of the new chart roll is placed on bearing surfaces in the recorder. The chart is then fed through suitable tension and guide rollers, and over the chart-forming bar before the front panel is closed. Once the front panel is closed, the chart is fed between a chart drive roller and a pressure roller to a take-up roller or the like.

A major problem with front-loading recorders has been in loading and removing a roll of chart, particularly removing a full roll of chart, for there is hardly space for the operator to reach in to lift the roll out and the diameter of a full roll is such that it is virtually impossible to grasp it from above or in front.

To facilitate loading, it is desirable to place tracks on the side plates of the recorder leading to the bearing surfaces on which the roll spindle is journaled. The problem is then of preventing the roll to turn or free-wheel in the track in order not to have loose paper to contend with, particularly while closing the front panel after feeding the chart through the tension and guide rollers.

It is desirable to facilitate feeding the paper through the tension and guide rollers by having the tension roller carried by the front panel (for ready access in adjusting tension by making an adjustment, for example, of a spring which urges the tension roller against a friction disc) and guide rollers on the recorder side plates. However, for proper tensioning of the chart, it is necessary to assure that the guide rollers are properly positioned to maintain the chart against a substantial peripheral portion of the tension roller. It is a problem to so place the guide rollers if the tension roller is not also permanently mounted on the recorder side plates.

Once the front panel is returned to its substantially upright, or closed, position, it is desirable to latch it in place and feed the chart through the drive and pressure rollers. The problem is to be able to do that at the front of the recorder in a facile manner without complicating the chart drive mechanism with the front panel assembly.

In servicing the recorder, particularly when rack mounted, it is often necessary to replace the stylus, or the stylus drive motor, and to make adjustments thereon, and on other parts of the recorder. It is also desirable to have a control box and panel mounted on the recorder as close to the recording station as possible both for compactness and for the convenience of the operator. The problem is to accomplish both objectives without any compromises and increased costs.

These and other problems are overcome by a recorder having a front panel hinged along the bottom thereof between two parallel side plates on an eccentric bar which, upon being rotated after the panel is raised to a substantially upright position, will engage latching elements mounted on the recorder. Sickle-shaped arms are attached to the sides of the panel to raise and lower a chart roll spindle along tracks on the side plates inclined downwardly from the front of the recorder to bearing surfaces as the panel is lowered and raised, and to cradle the spindle when the panel is swung down to a substantially horizontal position where it engages limit stops. A spring biased lever pivotally mounted to one side plate engages a square flange on the spindle to prevent the chart roll from turning while the spindle is being lowered, or raised, in the tracks and to prevent it from turning in the bearing surfaces until the front panel is closed. A pin on the sickle-shaped arm on the same side of the recorder engages the lever to lift it away from the flange when the eccentric bar is rotated and the front panel raised into engagement with the latching elements. To facilitate threading the chart, the chart-forming bar or writing table is carried by the upper end of the panel and a tension roller is carried by the back of the panel. Two guide rollers are mounted between the side plates to assure contact of the chart with a substantial peripheral portion of the tension roller. One guide roller is mounted on spring biased arms to assure proper positioning relative to the tension roller as when the front panel is latched into recording position. A control box and panel is mounted on the front of the recorder a short distance above the panel. To facilitate reaching the recording styli and motors therefor for servicing and replacement, the control box is mounted between the side plates for pivoting around points at its upper-rear corners. The drive and pressure rollers are mounted in front of the recorder, but below the front panel to be free of its operation. A deflection plate is placed behind the lower of the two rollers to facilitate feeding the chart therebetween from the front and bringing the chart back to the front for winding on a take-up roller.

Other advantages of the invention will become apparent from the following detailed description and claims, taken together with the accompanying drawings in which:

Figure 1:
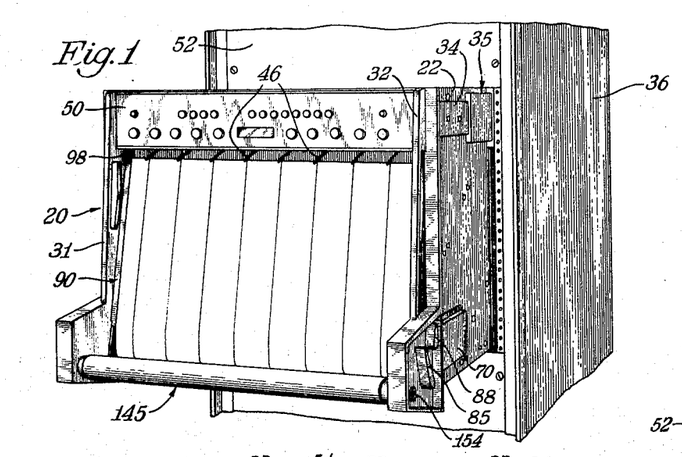
FIGURE 1 is a perspective front view of the recorder slideably mounted in a vertical rack enclosure and withdrawn therefrom.
Figure 2:
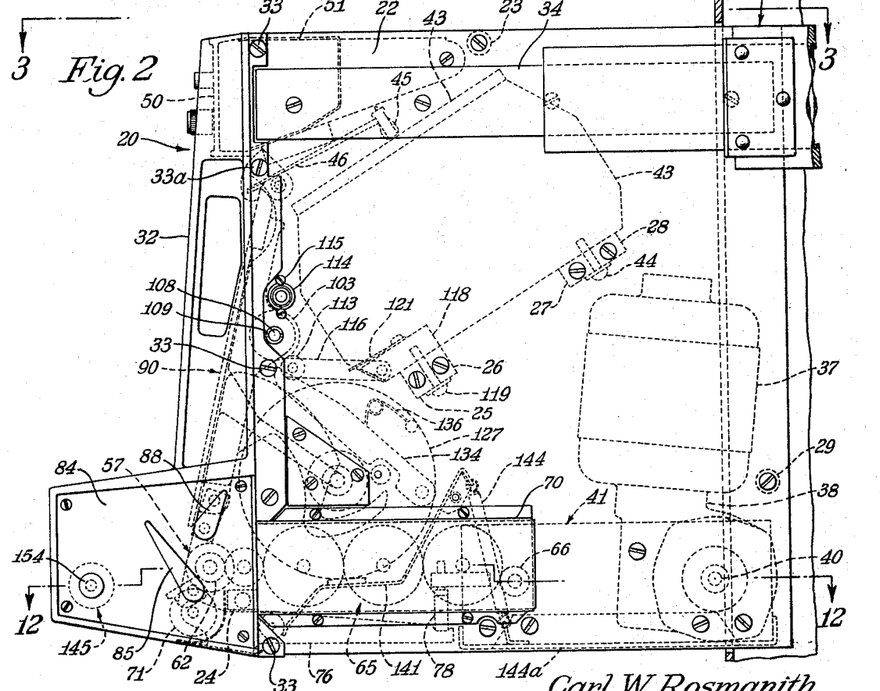
FIGURE 2 is a side view of the recorder in the withdrawn position with a fragment of the enclosure shown in vertical section.
Figure 3:
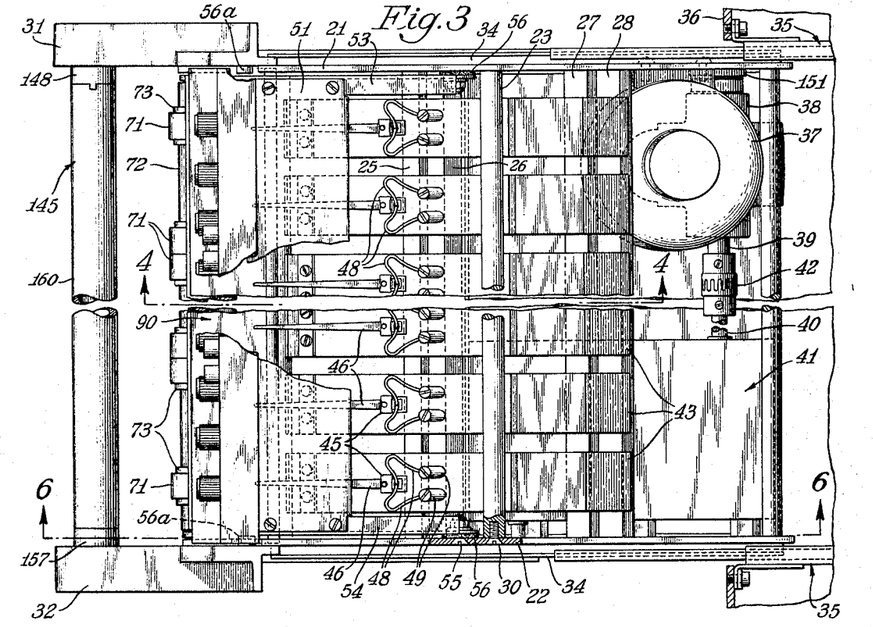
FIGURE 3 is a plan or top view taken along the line 3—3 of FIGURE 2.

Referring to FIGURES 1, 2 and 3, the recorder 20 comprises side plates 21 and 22 held in spaced relation by transverse bars 23, 24, 25, 26, 27, 28 and 29 fastened to the side plates by screws 30 as is typically shown in FIGURE 3. To the outer surfaces of the side plates 21 and 22, cast front framing members 31 and 32 are so securely attached by means of screws 33 as to be effectively integral parts of the side plates. To the upper portion of each side plate 21 and 22, the inner member 34 of a pair of three-element sliding rails 35 is securely attached. The outer portions of the sliding rails are secured within the enclosure 36 and serve to mount the entire recorder 20 therein. An electric motor 37 provided with a gear reduction head 38 is attached to the lower rear portion of the side plate 21. An output shaft 39 (FIGURE 3) protruding from the gear head 38 is coupled to the input shaft 40 of an electrically controlled variable speed gear box 41 through a coupling 42. The variable speed gear box 41 is secured to the lower rear portion of the side plate 22.

Figures 4, 5:
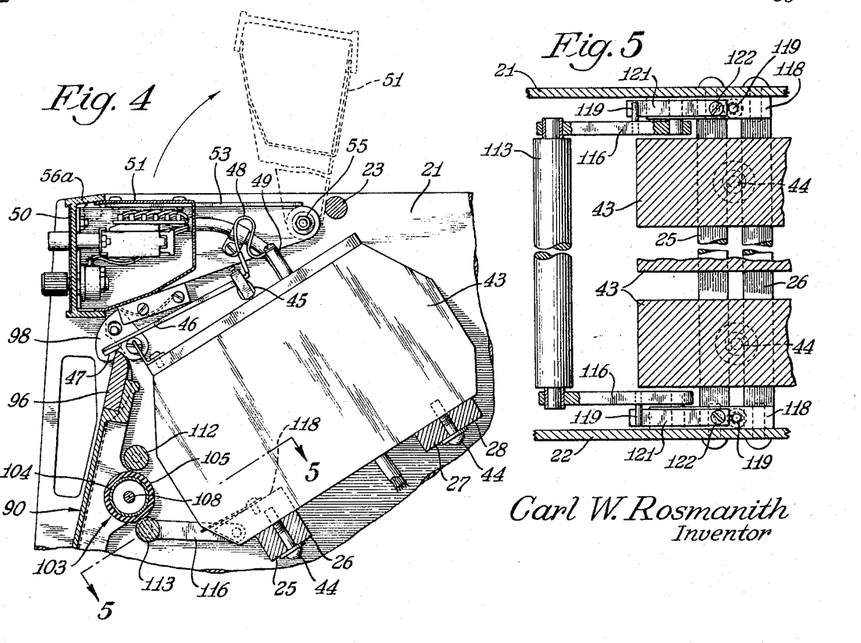
FIGURE 4 is a fragmentary vertical section taken on the line 4—4 of FIGURE 3 showing the manner in which the front panel and control box may be swung up and away from the recording styli and their associated drive motors.
FIGURE 5 is taken along the line 5—5 of FIGURE 4 showing the mounting of a guide roller mounted on spring biased levers for a chart tensioning system.

Mounted upon the spacing bars 25, 26, 27 and 28 are a plurality of styli drive motors 43, adjustably mounted in a lateral plane by screws 44. The output shaft of each drive motor 43 is provided with a suitable cradle 45 attached thereto and carries a recording arm 46. The forward end of the arm is provided with a stylus 47 more clearly shown in FIGURES 4, 6 and 7 in the form of heatable resistance wire with electrical current being conducted thereto through insulated flexible conductors 48 terminating at the posts 49 mounted on the top of the drive motor 43 as shown in FIGURES 3 and 4. It should be understood that the stylus may be an ink pen or other known type of recording stylus.

A control panel 50 and control box 51 are provided at the upper front of the recorder 20. Mounted thereto are a pair of arms 53 and 54 (FIGURES 3 and 4) which in turn are respectively pivoted to the side plates 21 and 22 by assemblies 55 each of which comprises a screw and self locking nut. A disc 56 of friction material is disposed between each of the arms 53 and 54 and the respective side plates 21 and 22. By proper tensioning of the screw and nut of assemblies 55 the control panel 50 and box 51 can be readily moved to any stationary position between a horizontal and a vertical position illustrated in FIGURE 4 thereby giving servicing access to the recording arms 46 and associated drive motors 43. A protrusion in the form of a circular stud 56 extends inwardly from inner surfaces of the front frames 31 and 32 to provide stops on which extending edges of the box 51 rest when in the lowered position. Although these stop studs are so positioned as to engage the upper edges of the housing 51, it should be understood that they could just as well be positioned lower to engage the bottom edge of the housing 51, but even then only studs are employed and not a resting bar between side plates 21 and 22 because such a transverse bar would interfere with ready access to the recording arms which are frequently removed for servicing, and because such a bar would have to be removed in order to remove the drive motors 43 which are also often removed for servicing.

Although the enclosure 36 is provided with a front plate 52 so that the control box 51 cannot be raised to gain access to the recording arms 46 without withdrawing the recorder 20 to the open position shown, it should be understood that the front plate 52 may be omitted or set back to allow the control housing 51 to be raised while the recorder 20 is in the closed position.

Figure 7:
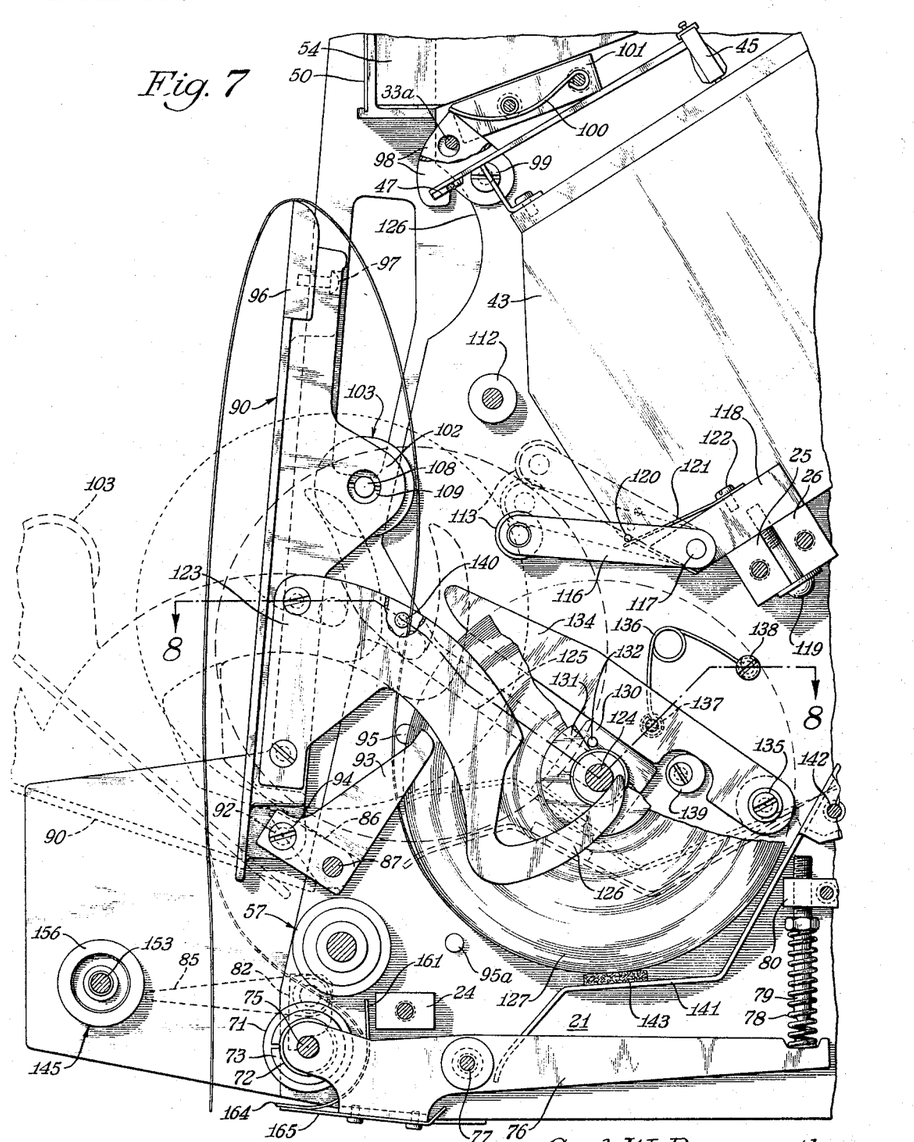
FIGURE 7 is a vertical section substantially identical to FIGURE 6 but illustrating the manner in which the front panel is swung down for loading and removing a roll of chart.
Figure 8:
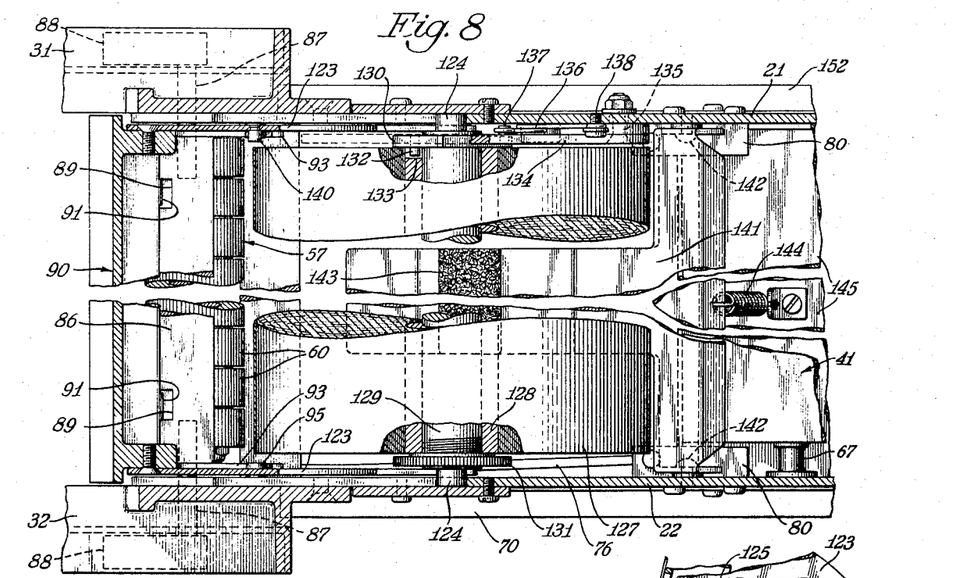
FIGURE 8 is a fragmentary horizontal section taken on the line 8—8 of FIGURE 7 showing the journalling of the chart roll spindle on bearing surfaces on the side plates of the recorder.
Figure 9:
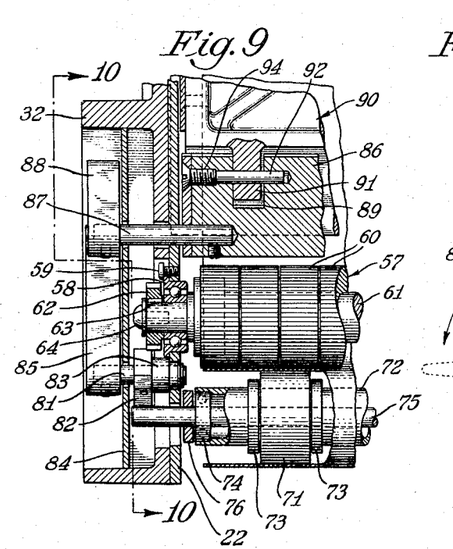
FIGURE 9 is a fragmentary vertical section taken on line 9—9 of FIGURE 6 showing the typical mounting of the roller for driving the chart and its associated pressure roller.
Figure 10:
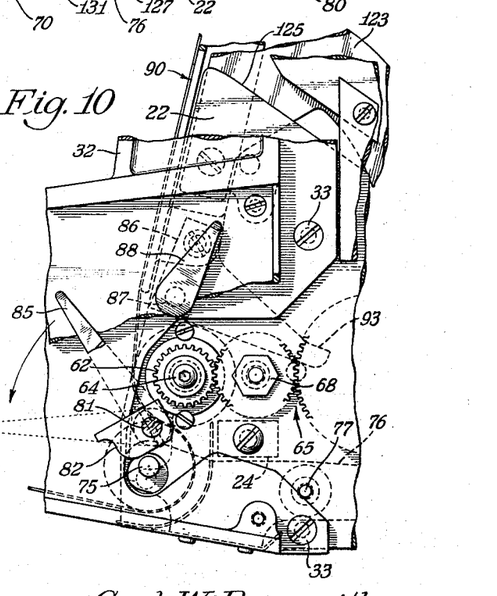
FIGURE 10 is a fragmentary side view partially in section taken on the line 10—10 of FIGURE 9 showing a portion of the gear drive to the drive roller and the typical lever operated cam for releasing the pressure roller.
Figure 12:
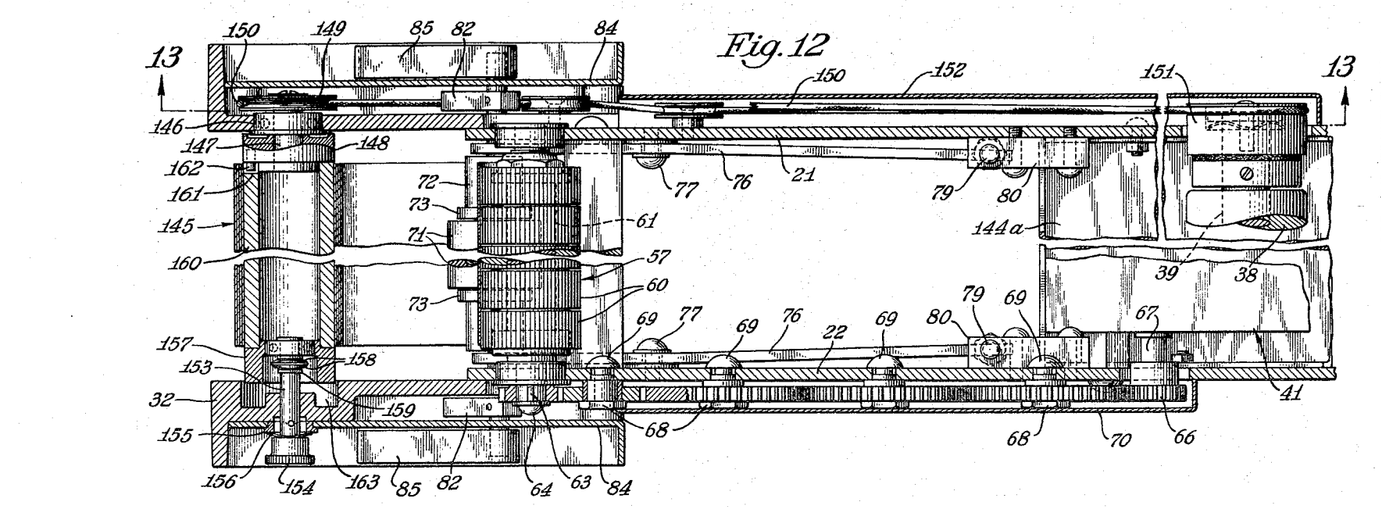
FIGURE 12 is a fragmentary horizontal section taken on the line 12—12 of FIGURE 2 showing the drive train gears from the gear box to the drive roller and the mounting of the removable take-up roller.
Figure 13:
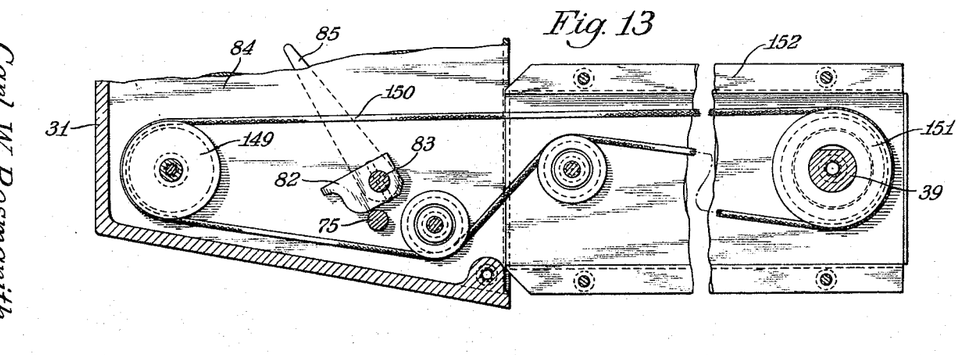
FIGURE 13 is a vertical section taken on the line 13—13 of FIGURE 12 showing the belt drive from the slip clutch mounted on the output end of the recorder drive motor gear head to the takeup roll pulley.

A drive roller 57 is located at the lower front of the recorder 20 as shown in FIGURE 2, and more clearly in FIGURES 6 to 9. It is journaled in bearings such as a bearing 58 pressed into an opening in the side plate 22 and held therein by a head of a screw 59 as shown in FIGURES 9 and 10. Screws 59 fasten a journal bearing to the left side plate 21 in a similar fashion to support the other end of the drive roller 57 which may be comprised of a plurality of roller segments 60 or a single elongated segment provided with peripheral knurling and mounted on a shaft 61. Reduced ends of the shaft 61 protrude through the bearings 58, and the end next to the side plate 22 has a gear 62 secured thereto by means of a key 63 and retaining screw 64 with a washer. The gear 62 is in mesh with a train of gears 65 which in turn mesh with a gear 66 securely mounted on the output shaft of the variable speed gear box 41. Each of the gears in the drive train 65 is provided with a bearing insert adapted for mounting upon a gear bearing stud 68 mounted on the side plate 22 by screws 69 as shown in FIGURE 12. A box-like housing 70 fastened to the side plate 22 shown in FIGURES 1, 11 and 12 encloses the gear train 65.

Disposed below the drive roller 57 are a series of rubber pressure rollers 71 which are rotatably mounted on a tube 72 as shown in FIGURE 3 and held in spaced relation by mean grip rings 73 which engage the tube 72. The tube 72 has ball bearings 74 pressed into its ends and the assembly is mounted upon a transverse shaft 75 as shown in FIGURE 9. The shaft 75 is carried at the forward end of a pair of levers 76 which are pivotally mounted on the inner surfaces of the side plates 21 and 22 by screws 77 as shown in FIGURE 12.

Figure 6:
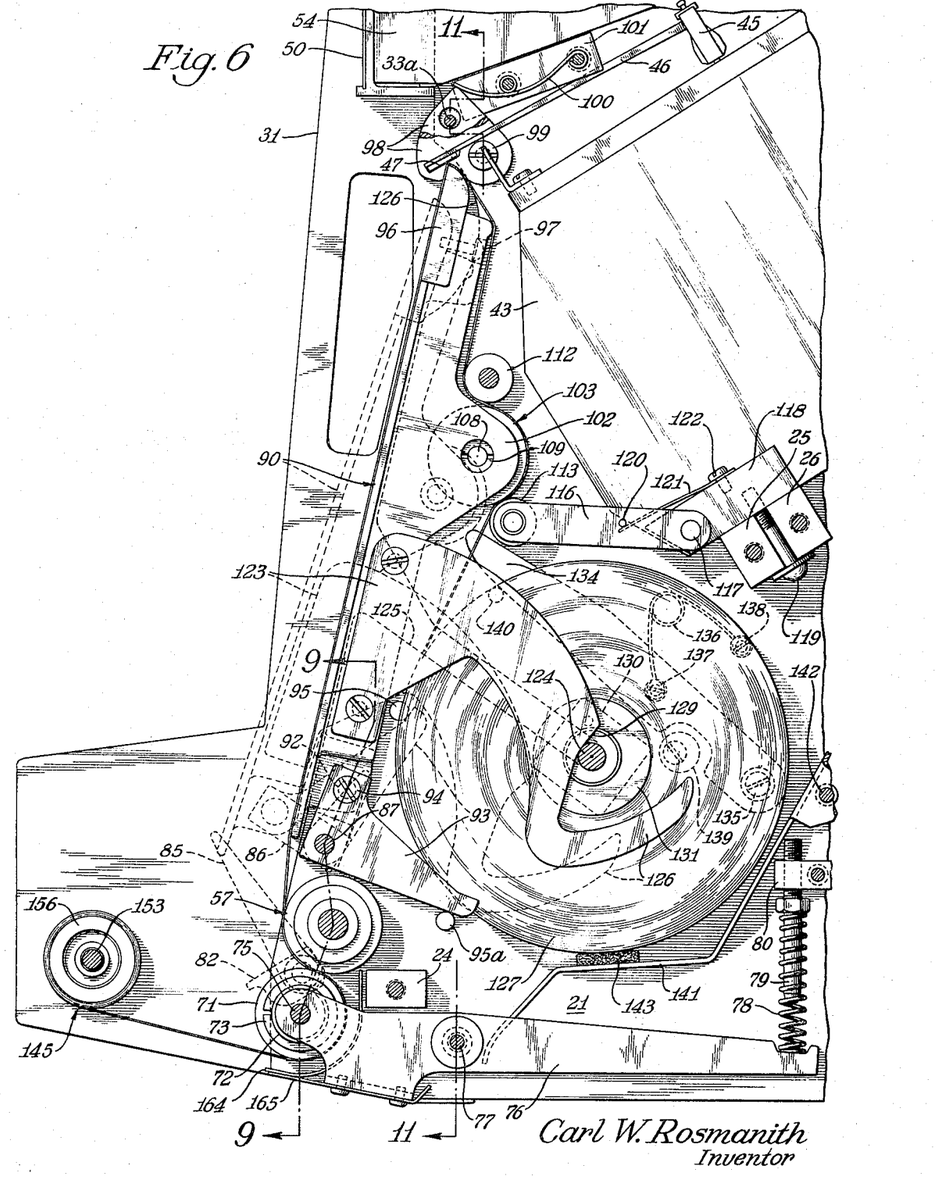
FIGURE 6 is a vertical section taken on line 6—6 of FIGURE 3 showing the front panel in recording position with the roll of chart recording paper inserted and threaded through drive and pressure rollers to a take-up roller.

The rearward extending arms of the levers 76 are provided with a seat for reception of the ends of coil springs 78 as shown in FIGURE 6 for the lever pivotally mounted on the side plate 21. The convolutions of the springs 78 slidably engage the lower position of studs 79 provided with hexagonal shoulder portions against which the upper ends of the springs 78 seat. The upper ends of the studs 79 threadably engage blocks 80 securely fastened to the inner surfaces of the side plates 21 and 22 to provide pressure adjustment of the springs 78. The force of the springs 78 upon the levers 76 exert a contact pressure of the pressure rollers 71 against the drive roller assembly 57 for driving the chart recording paper.

The ends of the shaft 75 carried by the arms 76 protrude through openings in the front frame members 31 and 32 for engagement with a pressuure roller release means which, referring to FIGURES 9 and 10, comprises a shaft 81 having a cam 82 pinned thereto, rotatably carried by a bearing 83 pressed into the side plate 22. The cam 82 is enclosed within the protruding portion of the front frame member 32 by a cover plate 84. The shaft 81 extends through an opening in the cover plate 84 and is provided with a release lever 85 mounted thereto. In operation the lever 85 when depressed as shown by dotted lines in FIGURE 10 causes the cam 82 to engage the end of the shaft 75 and force the pressure roller assembly downward and away from the drive roller. These two positions are also shown in FIGURES 6 and 7. The depressed position of the pressure roller is maintained by a seat and stop abutment provided in the cam and is released only through manual operation of the lever 85. A corresponding assembly is provided at the left side of the recorder to force both sides of the pressure roller 71 away from the drive roller 57. (See FIGURE 11.)

Figure 11:
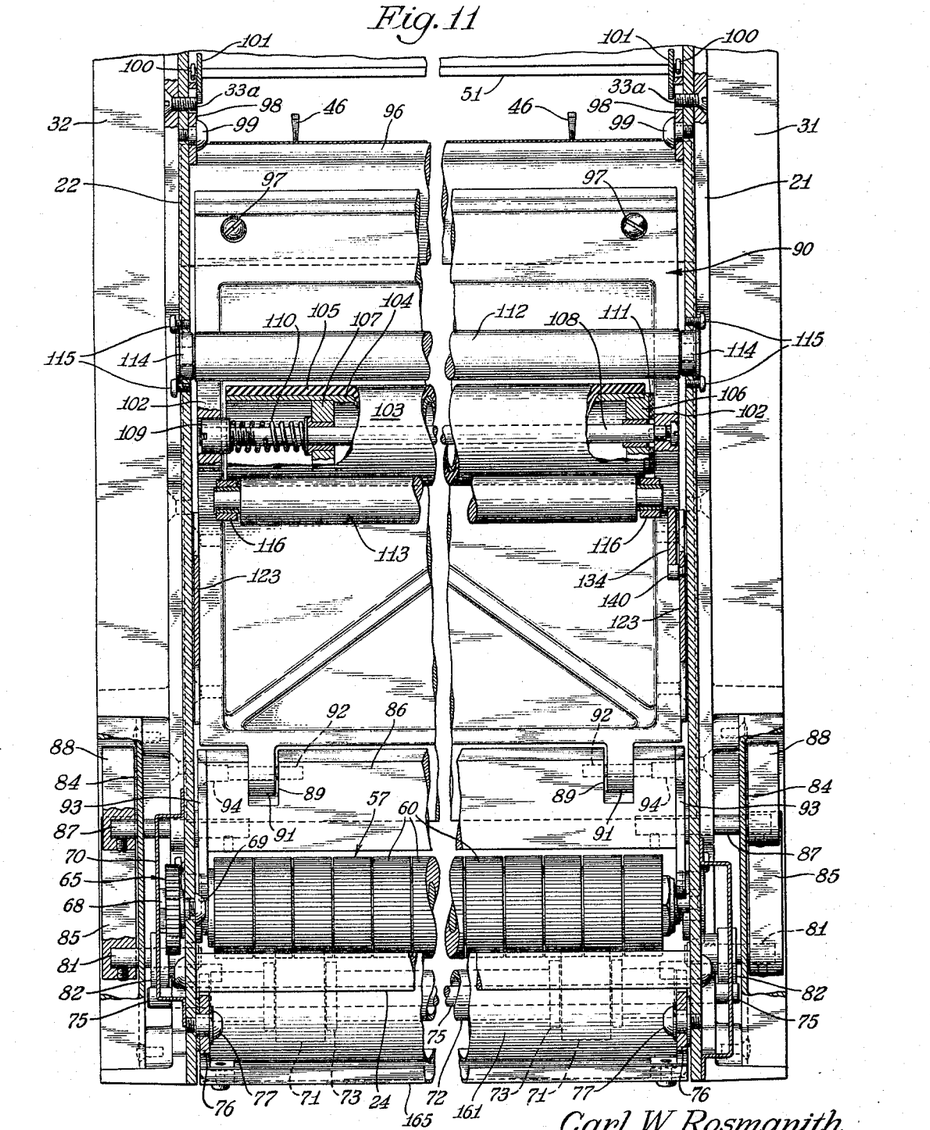
FIGURE 11 is a vertical section taken on the line 11—11 of FIGURE 6 showing the chart tension and guide rollers, and the hinging of the articulated front panel.

Referring to FIGURE 11, a rectangular bar 86, located directly above the drive roller 57, is pivotally mounted to the side plates 21 and 22 by stub shafts 87 set into the bar 86 and held therein by set screws. The outer ends of the stub shafts 87 are provided with levers 88 attached thereto for manual pivoting of the bar 86. (See FIGURES 6, 7, 9, 10 and 11.) Cutouts 89 near each end of the bar 86 are provided for the reception of a cast aluminum front panel 90. Stiffening ribs are cast as an integral part to the inner surface of the front panel 90. The lower rib has two ear-like bosses 91 formed thereto for nesting within the cutouts 89 in the bar 86, for pivotal mounting as indicated by the pins 92.

The ends of the bar 86 are provided with pivoting motion limiting levers 93 attached thereto by screws 94. The screws also serve to hold the pivot pins 92 in their respective bores in the bar 86. The inner surfaces of the side plates 21 and 22 are provided with protruding stop pins, such as stop pin 95 shown in FIGURE 6, against which the limiting levers 93 abut when the bar 86 is pivoted to its lowered position by means of the operating levers 88.

The upper edge of the front panel 90 is provided with a recess for the reception of a wear resisting stainless steel chart forming bar 96. The flat front surface of the bar 96 is aligned flush with the machined front surface of the front panel 90 and is attached thereto by a plurality of screws 97. The top rear surface is finished to provide a knife-like edge over which the recording chart passes. The outer ends of the knife edge of the bar 96 are received in inverted V notches provided in latching elements 98, pivotally mounted to the inner surfaces of the side plates 21 and 22 by means of screws 99. Openings in the latching elements 98 surround the protruding ends of the screws 33a and serve to limit the pivoting action. Spring wires 100 are attached to the side plates 21 and 22 through screws and cover plates 101. The cover plates 101 are held in spaced relation to the side plates by suitable spacers allowing the springs to move freely. The forward end of the springs 100 bears against the upper corners of the latching elements 98 and exert a downward force to the latches.

It should be understood that the forming bar 96 should have a flat surface between its outer edges in place of the knife-like edge for other types of styli, such as for ink recording styli.

Vertical stiffening ribs along each side of the front panel 90 are provided with inwardly extending tab 102 seen more clearly in FIGURES 6 and 7 for reception of a tension roller 103. The roller 103 comprises a tube 104 covered by a rubber sheet or tube 105 bonded thereto. A bearing retaining plug 106 is pressed into one end of the tube 104 while the opposite end is provided with a similar plug 107 pressed in to a given depth. The roller assembly 103 is rotatably mounted upon a shaft 108 fixed at one end to the tab 102 of the vertical stiffening member of the front panel. The opposite end of the shaft 108 is threaded and provided with a circular adjusting nut 109 journaled in an opening provided in the opposite tab 102. A spring 110 is disposed between the nut 109 and the plug 107 and imparts a pressure force to the roller 103 in the direction of the end plug 106. Between the end plug 106 and the inner surface of the protrusion 102, a disc 111 of friction material is disposed and is adhesively secured to the protrusion 102. By adjustment of the nut 109 the torque required to rotate the paper tensioning roller 103 may be suitably varied.

A pair of guide rollers 112 and 113 are positioned adjacent to the tension roller 103, to assure substantial contact of the chart with the periphery thereof. The upper roller 112 has reduced ends journaled in bearings 114 pressed into openings in the side plates, the bearings being held therein by heads of screws 115. The lower guide roller 113 has its reduced ends journaled in bearings carried in a pair of arms 116 one of which is more clearly shown in FIGURES 6 and 7. The arm 116 is pivotally mounted with pin 117 to support-block 118 mounted upon the transverse bars 25 and 26 by screw 119. The corresponding arm on the other end of the guide roller is similarly mounted. The arm 116 has a pin 120 pressed therein adapted to engage a leaf spring 121 mounted to the top of the block 118 by the screw 122. The pin 119 bearing against the springs 121 on each side serves to hold the roller 113 in the position shown in FIGURE 6 with minute pressure exerted at the point of contact where the chart begins to form over the surface of the tension roller 103. The pivoting action of the arm 116 enables the guide roller 113 to swing upwardly in response to contact with the roll of chart paper as it is lowered into position as illustrated in FIGURE 7.

The vertical stiffening ribs along each side of the front panel 90 have a pair of sickle-shaped arms 123 attached thereto shown more clearly in FIGURES 6 and 7 for loading the roll of chart into the unit. The arms are so shaped to hold a roll of chart in proper position while recording as shown in FIGURE 6. When the front panel 90 is in its lowered position as shown in FIGURE 7, the end 126 of the arm 123 engages a spindle the ends of which protrude from the chart roll and extend into tracks 125 cut into the inside face of the side plates 21 and 22. When the front panel is swung down to the outermost position shown in FIGURE 7 by dotted lines, the spindle will no longer be engaged by the ends 126 of the arms 123; instead, the spindle 124 will be free of the tracks 125 and be resting in the cradles of the arms 123. When a new chart roll is loaded into the recorder, the downward slope of the branches of the arms 123 will assure proper nesting of the spindle 124 in the cradles. Thereafter, when the front panel 90 is rotated clockwise, the sickle-shaped arms 123 will guide the spindle 124 into the tracks 125 and allow the roll to be slowly lowered into proper position in FIGURE 7. Upon further raising of the front panel 90 to its substantially upright position, the end 126 will become disengaged from the spindle and finally a stop abutment 129 will engage the spindle to retain the spindle 124 at the bottom ends of the tracks 125, thereby securing the chart roll in place for recording as shown in FIGURE 6.

It should be noted that merely rotating the front panel 90 clockwise will bring it only to the dotted line position of FIGURE 6. To bring it to the full line position for recording, the levers 88 on each side of the recorder (one side being shown in FIGURES 1 and 2) are rotated clockwise to pivot the eccentric bar 86 shown in FIGURE 6. Pivoting the bar 86 raises the front panel until the bar 96 at the upper end thereof engages latching elements 98. The hinge pin 92 shown in FIGURE 12 swings through its operating arc and travels beyond top dead center of a center line between pivoting stub shafts 87 and the knife edge of bar 96, producing a locking action of the front panel 90 when in recording position by action of springs 100 bearing against the latching elements 98. The over top dead center position of the pin 92 amounts to approximately 8 degrees and is maintained by abutment of limiting levers 93 shown in FIGURES 6 and 7 with a protruding stop pin 95a.

The roll of chart 127 wound upon a core 128 is mounted upon spindle 124 which has reduced ends for journalling in the tracks 125 in the side plates 21 and 22. To one end of the spindle 124 a square flange 130 (FIGURE 7) is attached for abutment of the chart roll. The opposite end of the shaft is threaded for reception of a disc-like nut 131 (FIGURE 8) provided with a knurled rim for manually securing the chart roll 127 upon the spindle 124. The square flange 130 carries a pin 132 adapted to rest within a notch 133 in the chart roll core 128, thereby locking the chart roll 127 to the spindle 124.

A lever 134 is pivotally mounted to the side plate 21 by a bolt 135 as shown in FIGURE 7. One end of a single coil spring 136 is attached to the lever by a pin 137 with the opposite end attached to the side plate 21 by a pin 138. An adjustable stop 139 is attached to the side plate 21 against which the lever 134 rests, when the front panel 90 is in lowered position for loading the chart roll 127. As the chart roll is being transferred from the cradle of the sickle-shaped arms 123 to the side plate tracks 125 during a loading operation, the square flange 130 of the chart roll shaft will engage the forward end of the lever 134. The bottom edge of the lever 134 is arced at the tip to impart a camming-like action to the flange 130 and rotate the roll slightly (at the moment of entry to the tracks 125) to align one of the edge surfaces of the flange 130 in contact with the lower edge of lever 134. The lever 134 is so adjusted by means of the stop 139 that the contact force of the lever 134 and edge of the square flange is minute and does not impede the sliding action of the chart roll down the tracks 125 in the side plates.

The lever prevents the chart roll from free wheeling as it is lowered into the unit, thereby preventing a looseness of the paper between the chart roll 127 and the paper tensioning roller 103, when the front panel 90 has been returned to recording position. The prevention of looseness between the chart roll 127 and the paper tensioning roller 103 ensures that the chart paper runs smoothly over the knife edge of the bar 96 and does not wander from side to side while being run through the instrument. A pin 140 attached to the sickle-shaped arm 123 on the left of the recorder engages the lever 134 to raise the lever when the front panel 90 is in latched position for operation thereby permitting free rotation of the chart roll as shown in FIGURE 6.

A brake shoe 141 in the form of a bent plate is provided to prevent the chart roll from coasting when the speed of the paper is change from fast to slow as it passes through the recorder. The plate is provided with ears at its outer ends for pivotal attachment to the side plates 21 and 22 by pins 142. A felt pad 143 is adhesively attached to the plate where it contacts the chart roll. A spring 144 attached to a bent down flange at the back of the brake shoe plate 141 has its opposite end attached to an angle bracket located on a base plate 145 spanning the side plates 21 and 22 and fastened thereto as shown in FIGURES 2 and 8. The spring 144 creates the contact pressure between the felt pad 143 and the chart roll 127.

A take-up roller 145 is provided at the lower front of the recorder, disposed between the lower front protruding portions of the frame members 31 and 32 as shown in FIGURE 1. A bearing 146 pressed into an opening provided in the frame member 31 journals a stub shaft 147 upon which a shouldered hub 148 has been pressed as shown in FIGURE 12. The opposite end of the shaft has a pulley 149 secured thereto for driving the take-up roller 145. A drive belt 150 connects the take-up with a slip clutch drive pulley assembly 151, mounted upon the output shaft 39 of the gear reduction head 38 of the electric motor 37. The rotational speed of the take-up is always sufficient to receive the chart and keep it taut between the drive roller 103 and take-up roller 145, regardless of the speed with which it is dispensed. A box-like housing 152 encloses the belt 151 where it runs along the outside of the side plate 21. The forward end of the belt 151 is enclosed within the front frame member 31 by the cover plate 84.

The frame member 32 has a shaft 153 provided with a knob 154, slideably mounted therein. A conventional 90 degree bayonet-type grip 155 is mounted in the cover plate 84 to retain the shaft 153. An arced spring washer 156 disposed between the knob 154 and the bayonet grip 155 serves to latch the shaft in position, the release being accomplished manually. The inner end of the shaft 153 has a bearing carrying shouldered hub 157 slideably mounted thereon. The bearing within the shouldered hub 157 has slight sliding action on the shaft 153 permitted by collapsing of arced springs 158 retained by a grip ring 159 in a groove in the shaft 153.

A tube 160 is mounted upon the shoulders of hubs 148 and 157 for receiving the dispensed chart paper. One end of the tube 158 is provided with a notch 161 for reception of a pin 162 mounted in the shouldered hub 148 to drive the tube 160.

The mounting or removal of the tube 160 from the shoulders of the hubs 148 and 157 is accomplished manually through the rotational release of the bayonet grip 155 and withdrawing the hub 157 within a recess 163 provided in the front frame member 32.

When loading the chart roll 127 into the recorder, the spindle 124 mounting the roll 127 is placed in the cradle of the sickle-shaped arms 123 when the front panel 90 is in open position as shown in FIGURE 7 by dotted lines. At this time, a sufficient amount of chart is pulled from the roll 127 and dropped over the knife edge of the forming bar 96 located at the top of the front panel 90 which is then moved to its upright position and latched in place as shown in FIGURE 6. The dropped end of the chart is then inserted between the drive roller 57 and the pressure roller 71 released by rotating the levers 85 counterclockwise to the position shown by dotted lines in FIGURE 7 and then returned to the operating position by rotating the levers 85 in the opposite direction thereby pressing the chart firmly against the drive roller 57. A deflector plate 164 spanning the gap between the pressure roller arms 76 and attached thereto by a plate 165 deflects the chart around the drive roller to the front of the recorder where it can be manually wrapped around the take-up roller and secured thereto, or if preferred, allowed to accumulate in a fan-fold fashion in a box or tray below.

While the principles of the invention have now been made clear in an illustrative embodiment, there will be immediately obvious to those skilled in the art many modifications which are particularly adapted for specific applications without departing from those principles. The following claims are therefore intended to cover and embrace any such modifications, within the limits only of the true spirit and scope of the invention.

What is claimed is:

1. In a recorder having a pair of parallel sides, a spindle adapted to receive a chart roll, a bearing surface supported by each side for journalling each end of said spindle, a track extending downwardly along the inside of each of said pair of parallel sides from the front of the recorder to said bearing surfaces, and a front panel supported at the front of said recorder and hinged at the bottom in order to rotate away from a substantially upright position against the recorder to a substantially horizontal position to gain access to the interior thereof for removing or replacing chart rolls and servicing equipment therein, the improvement comprising a sickle-shaped lever fastened to each side of said panel and extending downwardly into the recorder, the blade-like arms at their free end extending upwardly with a portion below said tracks when said panel is in the substantially upright position, and the inside edges of said blade-like arms extend above said bearing surfaces to engage the spindle at each end thereof to push the spindle up along said tracks when the panel is rotated from its substantially upright position to its substantially horizontal position.

2. In a recorder as defined by claim 1, the improvement further comprising means for securing the upper edge of said front panel against rotation when it is in its substantially upright position, eccentric means pivotally mounted to the sides of said recorder by shafts set therein along a line near the lower edge thereof and said front panel is hingedly connected to the upper edge thereof, whereby pivoting of said eccentric means away from said recorder moves the lower edge of said panel down and away from said recorder, and drops the upper edge of said panel down away from said securing means to disengage the upper edge of said panel therefrom.

3. In a recorder as defined by claim 2, the improvement further comprising a lever pivotally mounted on one of said parallel sides and so spring biased into a position substantially parallel to the track along the inside of said one side as to require a force greater than that of said spring to move it away from said track, the lever being displaced a predetermined distance from said track, and disposed substantially the full length of said track, a flange on said spindle at the end thereof engaged by the track of said one side as a roll of chart is placed in said recorder, said flange having more than one flat side whereby said roll of chart may rotate less than one full turn in said track as it is being inserted before said lever engages one of said flat sides of said flange and, due to the force of said spring, prevents further rotation of said chart roll, and a pin carried by said front panel and sickle-shaped arm combination for deflecting said lever away from said flange against said spring force as said eccentric means is rotated toward said recorder to move the lower edge of the front panel up and toward said recorder, and raise the upper edge of said panel up against said securing means.

4. In a recorder as defined by claim 2 the improvement further consisting of selecting the length of said sickle-shaped lever such that the inside edge of said blade-like arm thereof does not engage said spindle in said bearing surfaces until said eccentric means is pivoted away from said recorder.

5. In a recorder as defined by claim 4, the improvement further consisting of having a substantial portion of said blade-like arm formed by cutting a substantially triangular portion from the lever at the root of the blade-like arm to provide an acute angle between the lever and its blade-like arm both sides of which remain inclined upwardly for all positions of the lever as the front panel is rotated from its substantially upright position to its substantially horizontal position.

6. In a recorder as defined by claim 4, the improvement further comprising a heat recording stylus connected to the shaft of a motor mounted within said recorder behind said front panel such that the stylus rests upon the upper edge of said front panel when in its substantially upright position, said upper edge of said front panel consisting of a chart-forming bar attached to the upper edge thereof, said bar having a straight upper edge over which the chart is driven under tension for recording by said stylus.

7. In a recorder as defined by claim 5, the improvement further comprising a control box for said recorder pivotally mounted between said pair of parallel sides at the front thereof and above said front panel, said control panel having its pivot points at its rear and a control panel at its front, and means for stopping the pivotal motion of said control box with the control panel in a substantially vertical position just above said chart-forming bar, said means allowing said control box to be pivoted upwardly away from said chart-forming bar, thereby providing ready access to said stylus and said motor.

8. In a recorder as defined by claim 4 having a chart drive roller and a pressure roller mounted between said pair of parallel sides and below the front panel for pulling chart from said chart roll over a chart-forming bar disposed across said front panel, the improvement further comprising a chart tension roller so mounted for rotation on the back of said front panel that when the front panel is in its substantially upright position it pushes the chart passing from the chart roll back into the recorder, and a pair of guide rollers mounted between said pair of parallel side and so disposed as to engage the tension roller, one substantially below and one substantially above the axis thereof to assure contact of the chart over a constant peripheral portion thereof to maintain a uniform tension on the chart being pulled from said roll by said chart drive roller.

9. In a recorder as defined by claim 8 wherein one of said guide rollers is mounted on pivoted arms spring biased to move upwardly into said tension roller on the side thereof receiving chart from the chart roll.

10. In a recorder as defined by claim 9 wherein said drive roller is mounted above the pressure roller and rotated in a direction for driving chart therebetween from the front thereof into said recorder, and an arcuate deflector plate disposed behind the pressure roller to deflect chart driven into said recorder back out to the front thereof, thereby facilitating loading a new roll of chart in the recorder from the front thereof.

References Cited
UNITED STATES PATENTS

| | | | |
|---|---|---|---|
| 2,435,260 | 2/1948 | Wise et al. | 346—113 |
| 3,051,408 | 8/1962 | Finch | 346—145 X |

RICHARD B. WILKINSON, *Primary Examiner.*

J. W. HARTARY, *Assistant Examiner.*